United States Patent
Park et al.

(10) Patent No.: US 11,061,722 B2
(45) Date of Patent: *Jul. 13, 2021

(54) PROCESSING TIMESTAMPS AND HEARTBEAT EVENTS FOR AUTOMATIC TIME PROGRESSION

(71) Applicant: Oracle International Corporation, Redwood Shores, CA (US)

(72) Inventors: Hoyong Park, San Jose, CA (US); Sandeep Bishnoi, Pleasanton, CA (US); Prabhu Thukkaram, San Ramon, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/653,758

(22) Filed: Oct. 15, 2019

(65) Prior Publication Data
US 2020/0042351 A1  Feb. 6, 2020

Related U.S. Application Data

(63) Continuation of application No. 15/696,501, filed on Sep. 6, 2017, now Pat. No. 10,514,952.

(Continued)

(51) Int. Cl.
*G06F 9/48* (2006.01)
*G06F 16/2455* (2019.01)

(52) U.S. Cl.
CPC ...... *G06F 9/4881* (2013.01); *G06F 16/24568* (2019.01)

(58) Field of Classification Search
CPC .................. G06F 9/4881; G06F 16/24568
(Continued)

(56) References Cited

U.S. PATENT DOCUMENTS

| | | | |
|---|---|---|---|
| 8,413,169 B2 | 4/2013 | Grabs et al. | |
| 8,874,526 B2 | 10/2014 | Hsieh et al. | |

(Continued)

FOREIGN PATENT DOCUMENTS

| | | | | |
|---|---|---|---|---|
| WO | WO-2017023432 A1 * | 2/2017 | ....... | G06F 16/90335 |
| WO | 2017069805 | 4/2017 | | |

OTHER PUBLICATIONS

U.S. Appl. No. 15/696,501, Non-Final Office Action dated Jun. 14, 2019, 16 pages.

(Continued)

*Primary Examiner* — Andrew M. Lyons
(74) *Attorney, Agent, or Firm* — Kilpatrick Townsend & Stockton LLP

(57) ABSTRACT

An event processing system for processing events in an event stream is disclosed. The system is configured for configuring a stream processor to micro-batch incoming events from a stream source. The system is also configured for generating a single timestamp for a micro-batch of the incoming events and/or receiving the micro-batch of the incoming events from the stream source. The system can also be configured for assigning the single timestamp to each event of the micro-batch and/or generating separate timestamp values for each respective event of the micro-batch. In some examples, the system can also be configured for assigning, for each respective event of the micro-batch, an individual one of the separate timestamp values.

20 Claims, 9 Drawing Sheets

Related U.S. Application Data

(60) Provisional application No. 62/395,044, filed on Sep. 15, 2016.

(58) Field of Classification Search
USPC .......................................................... 718/101
See application file for complete search history.

(56) References Cited

U.S. PATENT DOCUMENTS

| | | | |
|---|---|---|---|
| 8,978,034 | B1 | 3/2015 | Goodson et al. |
| 9,244,978 | B2 | 1/2016 | Alves et al. |
| 9,256,646 | B2 | 2/2016 | Deshmukh et al. |
| 9,298,788 | B1 * | 3/2016 | Kekre .................. G06F 16/248 |
| 9,418,113 | B2 | 8/2016 | Bishnoi et al. |
| 9,672,082 | B2 | 6/2017 | Thukkaram et al. |
| 9,674,249 | B1 * | 6/2017 | Kekre ...................... H04L 65/60 |
| 9,992,269 | B1 | 6/2018 | Odom et al. |
| 10,211,969 | B1 | 2/2019 | Littlepage et al. |
| 10,235,417 | B1 * | 3/2019 | Sterin ................. G06F 16/1805 |
| 10,747,812 | B1 * | 8/2020 | Fang ................ H04N 21/23418 |
| 2005/0008261 | A1 * | 1/2005 | Wolff .................... H04N 21/854 382/305 |
| 2008/0072221 | A1 | 3/2008 | Chkodrov et al. |
| 2008/0301135 | A1 | 12/2008 | Alves et al. |
| 2010/0023797 | A1 | 1/2010 | Atluri et al. |
| 2010/0070470 | A1 | 3/2010 | Milencovici et al. |
| 2012/0137367 | A1 | 5/2012 | Dupont et al. |
| 2013/0339473 | A1 | 12/2013 | McCaffrey et al. |
| 2014/0201355 | A1 | 7/2014 | Bishnoi et al. |
| 2014/0328189 | A1 | 11/2014 | Fallon et al. |
| 2015/0169683 | A1 | 6/2015 | Chandramouli et al. |
| 2016/0034361 | A1 | 2/2016 | Block et al. |
| 2016/0070739 | A1 | 3/2016 | Gukal et al. |
| 2016/0085810 | A1 | 3/2016 | de Castro Alves et al. |
| 2016/0098457 | A1 * | 4/2016 | Johnson ................ G06F 16/951 707/722 |
| 2016/0219089 | A1 | 7/2016 | Murthy et al. |
| 2017/0024912 | A1 | 1/2017 | de Castro Alves et al. |
| 2017/0116050 | A1 | 4/2017 | Thukkaram et al. |
| 2017/0116210 | A1 | 4/2017 | Park et al. |
| 2017/0317935 | A1 | 11/2017 | Murthy et al. |
| 2018/0159731 | A1 | 6/2018 | Murthy et al. |
| 2018/0225158 | A1 | 8/2018 | Guigui et al. |

OTHER PUBLICATIONS

U.S. Appl. No. 15/696,501, Notice of Allowance dated Sep. 25, 2019, 8 pages.

Buevich et al., Respawn: A Distributed Multi-Resolution Time-Series Datastore, IEEE 34th Real-Time Systems Symposium, Vancouver, 2013, 10 pages.

Carbone et al., Apache Flink(TM): Stream and Batch Processing in a Single Engine, Bulletin of the IEEE Computer Society Technical Committee on Data Engineering, vol. 36, No. 4, Available Online at: http://asterios.katsifodimos.com/assets/publications/flink-deb.pdf, 2015, pp. 28-38.

Cui et al., Continuous Similarity Join on Data Streams, 20th IEEE International Conference on Parallel and Distributed Systems (ICPADS), 2014, pp. 552-559.

Dragos et al., SYNCY: A Software Engine for Data Stream Event Synchronization, 16th International Conference on System Theory, Control and Computing (ICSTCC), 2012, pp. 1-6.

Gehani et al., PAST: Probabilistic Authentication of Sensor Timestamps, 22nd Annual Computer Security Applications Conference (ACSAC'06), Dec. 2006, pp. 439-448.

International Application No. PCT/US2017/050514, International Preliminary Report on Patentability dated Mar. 28, 2019, 9 pages.

International Application No. PCT/US2017/050514, International Search Report and Written Opinion dated Oct. 16, 2017, 11 pages.

Wei et al., RTSTREAM: Real-Time Query Processing for Data Streams, Ninth IEEE International Symposium on Object and Component-Oriented Real-Time Distributed Computing (ISORC'06), 2006, 10 pages.

European Patent Application No. EP17768616.9 Office Action dated Feb. 7, 2020, 10 pages.

European Patent Application No. EP17768616.9 Notice of Decision to Grant dated Dec. 3, 2020, 2 pages.

Guller , "Big Data Analytics with Spark: A Practitioner's Guide to Using Spark for Large Scale Data Analysis," The Expert's Voice in Spark, Apress, XP055662491, Dec. 31, 2015, 28 pages.

* cited by examiner

PROCESSING TIMESTAMPS AND HEARTBEAT EVENTS FOR AUTOMATIC TIME PROGRESSION

CROSS REFERENCE TO RELATED APPLICATIONS

The present application is a continuation of, and claims the benefit and priority from U.S. application Ser. No. 15/696,501, filed Sep. 6, 2017, entitled "PROCESSING TIMESTAMPS AND HEARTBEAT EVENTS FOR AUTOMATIC TIME PROGRESSION", which claims benefit and priority under 35 U.S.C. § 119(e) to U.S. Provisional Application No. 62/395,044, filed Sep. 15, 2016, entitled "PROCESSING TIMESTAMPS AND HEARTBEAT EVENTS FOR AUTOMATIC TIME PROGRESSION," the entire contents of which are incorporated herein by reference for all purposes.

This application is also related to application Ser. No. 15/700,784, filed on Sep. 11, 2017, entitled "DATA SERIALIZATION IN A DISTRIBUTED EVENT PROCESSING SYSTEM," application Ser. No. 15/700,862, filed on Sep. 11, 2017, entitled "GRAPH GENERATION FOR A DISTRIBUTED EVENT PROCESSING SYSTEM," application Ser. No. 15/700,914, filed on Sep. 11, 2017, entitled "CLUSTERING EVENT PROCESSING ENGINES," application Ser. No. 15/701,019, filed on Sep. 11, 2017, entitled "DATA PARTITIONING AND PARALLELISM IN A DISTRIBUTED EVENT PROCESSING SYSTEM." The entire contents of each application is hereby incorporated by reference as if fully set forth herein.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for configuring a stream processor to micro-batch incoming events from a stream source. In an embodiment, the system is configured for generating a single timestamp for a micro-batch of the incoming events and/or receiving the micro-batch of the incoming events from the stream source. The system is also configured for assigning the single timestamp to each event of the micro-batch and/or generating, based at least in part on an algorithm, separate timestamp values for each respective event of the micro-batch. In some examples, the system can also be configured for assigning, for each respective event of the micro-batch, an individual one of the separate timestamp values.

In certain embodiments, the algorithm comprises a wall clock progression algorithm, an evenly distributed algorithm, an evenly distributed top off algorithm, or a simple sequence algorithm. In some examples, assigning the individual one of the separate timestamp values comprises appending the individual one of the separate timestamp values to the single timestamp for each event of the micro-batch. Additionally, the algorithm provides a unique timestamp for each event of the micro-batch and/or the algorithm ensures that each event of the micro-batch is identifiable as being part of the micro-batch. In some cases, the system can also be configured for assigning each event to one or more continuous query language engine partitions, identifying a first partition of the one or more continuous query language engine partition, and/or determining that the first partition has a window size larger than a number of events of the plurality of events in the batch that are assigned to the first partition. Further, in some cases, the system can be configured for generating a heartbeat event for the first partition and/or inserting the heartbeat event into the first partition.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
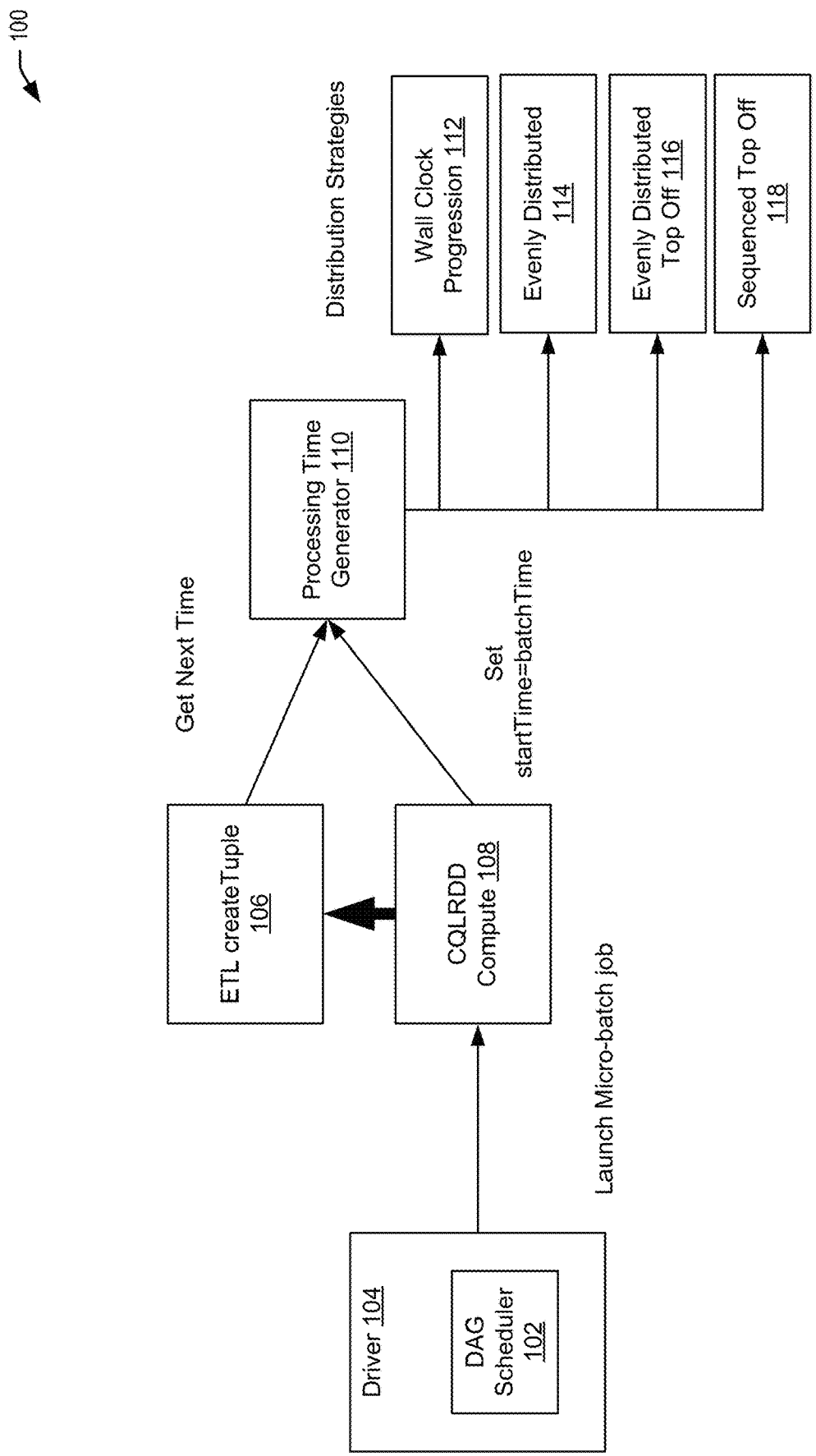
FIG. 1 depicts aspects of an example event processing system, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<timestamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)

-continued

| (<timestamp_N+5>, <PTEN,50>) |
| ... |

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Processing Timestamps

In recent years, data stream management systems (DSMs) have been developed that can execute queries in a continuous manner over potentially unbounded, real-time data streams. Among new DSMs, some of systems employ micro-batching based stream processing in order to provide a combination of batch processing and stream processing from a single framework. Spark Streaming running on Spark is one of such system. However, micro-batching stream processing does not provide event-by-event processing and assigns the same timestamp for all events for a micro-batch. As a result, micro-batching stream processing cannot detect the relationship within the same micro-batch or failed to create correct results for certain cases when the window slide duration should be milliseconds or nanoseconds.

One solution to the above problem with Oracle Stream Analytics is to generate unique timestamp for each events in micro-batch.

The following algorithm is used in generating timestamp:
1) use the 'batchTime' as the starting time of events created for the batch
2) the end of batch−1 is sent as a heartbeat event
3) All timestamp for tuples created from a batch should be in range (currentBatchTime+batchDuration−2)
4) Timestamps are assigned in ingestion stage where tuples are created
5) There are four different policies for distributing timestamps in the range of currentBatchTime to currentBatchTime+batchDuration (wallclock progression, evenly distributed, evenly distributed top off, and/or sequenced top off)
   With this solution, the following are new:
   Adding processing timestamp on micro-batching based stream processing
   Adding heartbeat for processing timestamp for automatic time progression Prior to use of the features described herein, micro-batch based stream processing could not assign different timestamps for each event, and event-by-event processing was not possible. Lack of event-by-event processing makes stream processing and time-series analytics very difficult, if not impossible. This solves several shortcomings of micro-batching based stream processing by adding event-by-event processing and allowing the use cases that were impossible to solve with micro-batching based stream processing to be solved.

FIG. 1 illustrates an example flow 100 for processing timestamps within an a micro-batching system. In some examples, a DAG scheduler 102 executed as part of driver 104 launches a micro-batch job. The job may include an ETL transformation that reads input events and creates tuples using createTuples 106 using ConvertToTupleRDD transformation having CQLRDD 108 as the child transformation. The compute method of CQLRDD 108 sets the current batch time as the start time and invokes the parent (ConvertToTupleRDD) transformation's compute method. In some examples, the ConvertToTupleRDD's compute method sets the processing timestamp to the tuples in the RDD using the processing time generator 110. The processing time generator 110 uses different distribution strategies to distribute the timestamp between the batches. For example, the processing time generator 110 may use a wall clock distribution strategy 112, an evenly distributed distribution strategy 114, an evenly distributed top off distribution strategy 116, or a sequenced top off distribution strategy 118.

Wall Clock Progression 112:
Use the difference of current time from the base
Incorporate the ingestion delay
Overflow protection
   cap the difference up to some time(say ½ or ⅔ of batch duration)
   Use sequence after reaching to the cap
Evenly Distributed 114:
Get the number of events in the micro-batch
Interval=(batch duration)/(number of events)
Evenly Distributed Top Off 116:
Distribution is controlled by user by providing 'maxRate'
for (seq<−0 until events.size)
   if (seq<maxRate)
      timestamp=(currentBatchTime+(seq*baseInterval)) <<3
   else
      timestamp=(currentBatchTime+(maxRate−1)*baseInterval)<<3+(maxRate−seq)
Sequenced Top Off (simple sequence) 118:
Each event in the micro-batch gets sequence number from the batch time
The unit is millisecond with overflow protecting by going to nanosecond after reaching to the end of batch.

Event Processing Services

Figure 2:
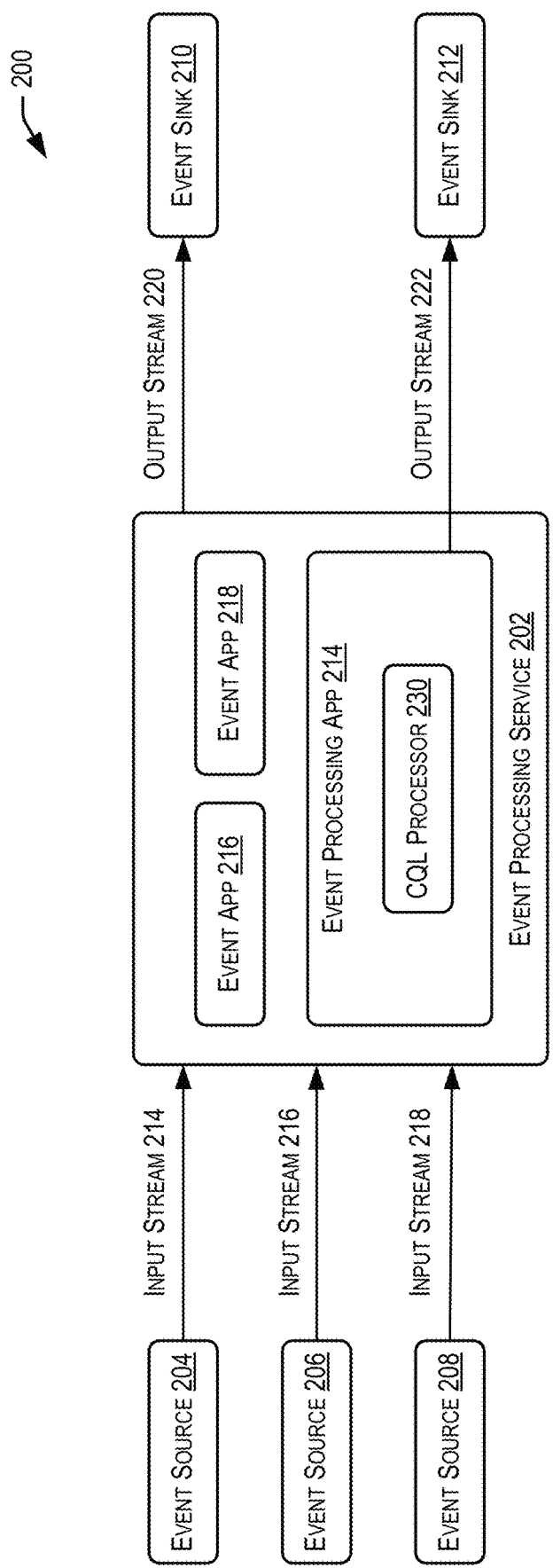
FIG. 2 is a simplified high level diagram of an event processing system that may incorporate an embodiment of the present disclosure.

FIG. 2 depicts a simplified high level diagram of an event processing system 200 that may incorporate an embodiment of the present disclosure. In an embodiment, the event processing system 200 may represent an Oracle Event Processor (OEP) system managed by Oracle®. Event processing system 200 may comprise one or more event sources (604, 206, 208), an event processing service (EPS) 202 (also referred to as CQ Service 202) that is configured to provide an environment for processing event streams, and one or more event sinks (610, 212). The event sources generate event streams that are received by EPS 202. EPS 202 may receive one or more event streams from one or more event sources.

For example, as shown in FIG. 2, EPS 202 receives a first input event stream 214 from event source 204, a second input event stream 216 from event source 206, and a third event stream 218 from event source 208. One or more event processing applications (614, 216, and 218) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (610, 212) in the form of one or more output event streams. For example, in FIG. 2, EPS 202 outputs a first output event stream 220 to event sink 210, and a second output event stream 222 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 214. As shown in FIG. 2, event processing application 214 is configured to listen to input event stream 218, execute a continuous query 230 comprising logic for selecting one or more notable events from input event 218, and output the selected notable events via output event stream 222 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 214 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real-time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

It should be appreciated that system 200 depicted in FIG. 2 may have other components than those depicted in FIG. 2. Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components. System 200 can be of various types including a service provider computer, a personal computer, a portable device (e.g., a mobile telephone or device), a workstation, a network computer, a mainframe, a kiosk, a server, or any other data processing system.

In some examples, micro-batching stream processing does not provide event-by-event processing and assigns the same timestamp for all events within the micro-batch. As the result, micro-batching stream processing may not be able to detect the relationship from the events within the same micro-batch.

Figure 3:
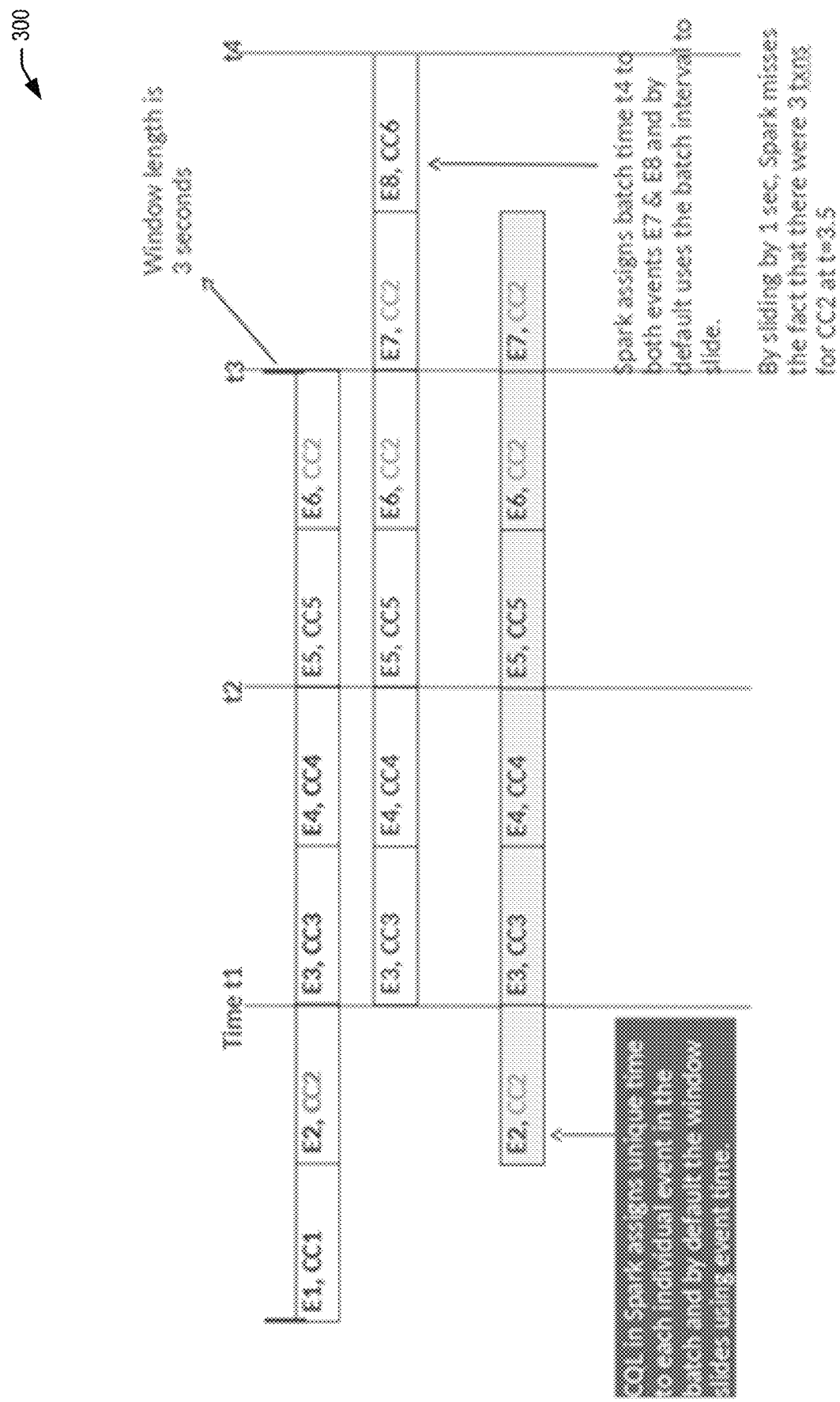
FIG. 3 is a block diagram illustrating an example use case of a distributed event processing system, in accordance with an embodiment of the present disclosure.

The more serious issue for having the same timestamps for all events within the micro-batch is that the correct results may not be created unless the window slide duration is milliseconds or nanoseconds. FIG. 3 shows such a case: the use case is to flag credit cards with three or more transactions in a three second interval. Batch intervals may be one second each, and it is assumed that event arrival rate is 2 events/second/batch. Processing timestamps are the timestamps that are assigned to tuples on creating tuples from ingestion to the system. Each timestamp should be monotonically increasing and should not be overlapped or duplicated with earlier timestamps. With using the same timestamp for each batch, the system will see the following events for two windows:

Window at time t0: {(E1,CC1),(E2,CC2),(E3,CC3),(E4,CC4),(E5,CC5),(E6,CC6)}

Window at time t1: {(E3,CC3),(E4,CC4),(E5,CC5),(E6,CC2),(E7,CC2),(E8,CC6)}

Assuming a window length of three seconds, the window at time t0 will go from t0 to t3, while the window at time t1 will go from t1 to t4. Thus, just looking at events for CC2, t0.5:(E2,CC2), t2.5:(E6,CC2), t3:(E7,CC2), there are three transactions within 3 second window with 0.5 second slide, but the above system using the same timestamp for each batch misses it. In other words, the system assigns batch time t4 to both events E7 and E8 and by default uses the batch interval to slide. However, by sliding by 1 second, the system would miss the fact that there were three transactions for CC2 at t=3.5.

Heartbeat Events for Automatic Time Progression

In order to provide event-by-event processing, processing timestamps and event timestamps have been added. Within an event-by-event processing system, the system needs to continuously progress the time. Otherwise, we can have issues like:

Delayed output

No expiration from window

No duration fire from missing event detection pattern matching

To illustrate the problem, Let's take an example where we have a range window running on two cql engines, running on two executors. For the sake of simplicity, it will be assumed that every batch contains one record.

Query: SELECT*FROM S[RANGE 3]

Input:

1001: 1

1002: 2

1003: 3

1004: 4

1005: 5

Suppose 1001 and 1002 goes to CQL Engine 1 which is processing partition-1. So, the window of CQL Engine 1 will have two records:
{(1001,1), (1002,2)}
And, the remaining three events go to CQL Engine 2 which is processing partition-2. So, the window of CQL Engine 2 will have three records:
{(1003,3), (1004,4), (1005,5)}
Thus, in this case of application timestamp, an empty CQL RDD at Node 1 will be evaluated when (1003,3) arrives because (1003,3) belongs to partition running on Node 2. Now with other three inputs, timestamp is moved to 1005. So, ideally events of window in CQL Engine 1 should expire as window size is 3. To expire those events, CQL Engine 1 may need a heartbeat from CQL RDD computation. However, it may not be known/clear who will propagate a heartbeat of 1003 to CQL Engine 1.

In some examples, one solution is to insert a heartbeat from re-partitioning and then track the latest event timestamp of the partition. Another embodiment is to sort the output events by time stamp and propagate the latest heartbeat to all partitions. For example:
A heartbeat from a custom partitioner can be inserted:
  1001,1 p1
  1002,2 p1
  1003.3 p2
  1004,4 p2
  1005,5 p2
  <1005,HT p1> (this is the heartbeat sent to partition 1)
And, then:
  From CQL RDD, the snapshot information may be sent and the largest event time from the partition can be added. In some cases, the max(largest eventtime) of batch is returned to CQL RDD as part of a getCQLEngine request.
  Batch 1
  1001,1 p1
  1002,2 p1
  send 1002 to CQLEngineTracker as part of snapshotInfo
  1003,3 p2
  1004,4 p2
  1005,5 p2
  send 1005 to CQLEngineTracker as part of snapshotInfo
  CQLEngineTracker
  largest event timestamp of p1—1002
  largest event timestamp of p2—1005
  largest event timestamp of batch=1005
  Batch2
  getCQLEngine(p1) return 1005 since 1002<1005
  Heartbeat of (1005) is sent to CQLEngine before input tuples
  largest event timestamp of p1—1005
  getCQLEngine(p2) does not include heartbeat since 1005=1005

Figure 4:
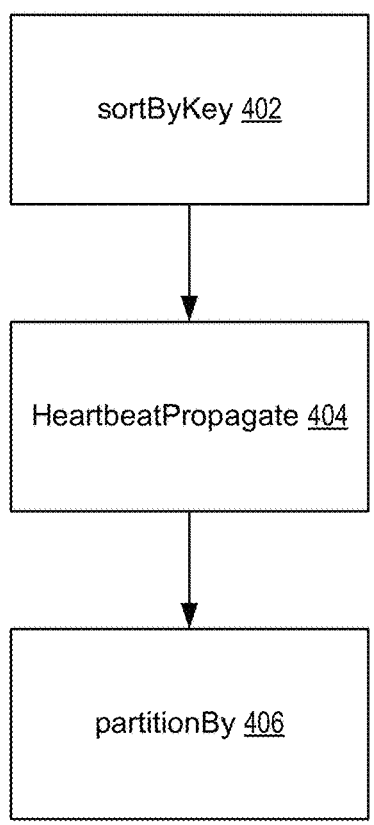
FIG. 4 is an example flow diagram of a process, in accordance with one embodiment of the present disclosure.

FIG. 4 illustrates a flow 400 for generating heartbeats. The initial heartbeat is generated while creating processing timestamps from ConvertToTupleRDD transformation. For every batch, we append one heartbeat event at the end of the batch with the highest timestamp within the processing timestamp duration for the batch. In case the batch is empty and there is no input events for the batch, we still insert one heartbeat event in order to ensure the time progression.

Heartbeats are propagated from the partitioning logic using the following algorithm:
  1. Sort the tuples in RDD using sortBykey transformation with timestamp as the key at 402
  2. Use HeartbeatPropagateRDD to copy heartbeats to partitions at 404.
  3. Use partitionBy transform to do actual partitioning and also the actual propagation of heartbeats to the partitions are done at 406.

The actual HeartbeatPropagation algorithm works as follows:
  1. Skip all heartbeats except the last one
  2. Remove duplicate heartbeat timestamps
  3. Copy heartbeats to every partition by having HBPartitionValue which carries the partition number.

Since the partitioning is done by some group by field, the heartbeat events cannot be partitioned using such criteria because the heartbeat event only carries the timestamp. The HBPartitionValue is the special mark object that carries the partition information in it. When the partitioner sees the HBPartitionValue from the heartbeat event, the partition value can be properly extracted and is used to set the heartbeat event to the partition.

Example Methods

Figure 5:
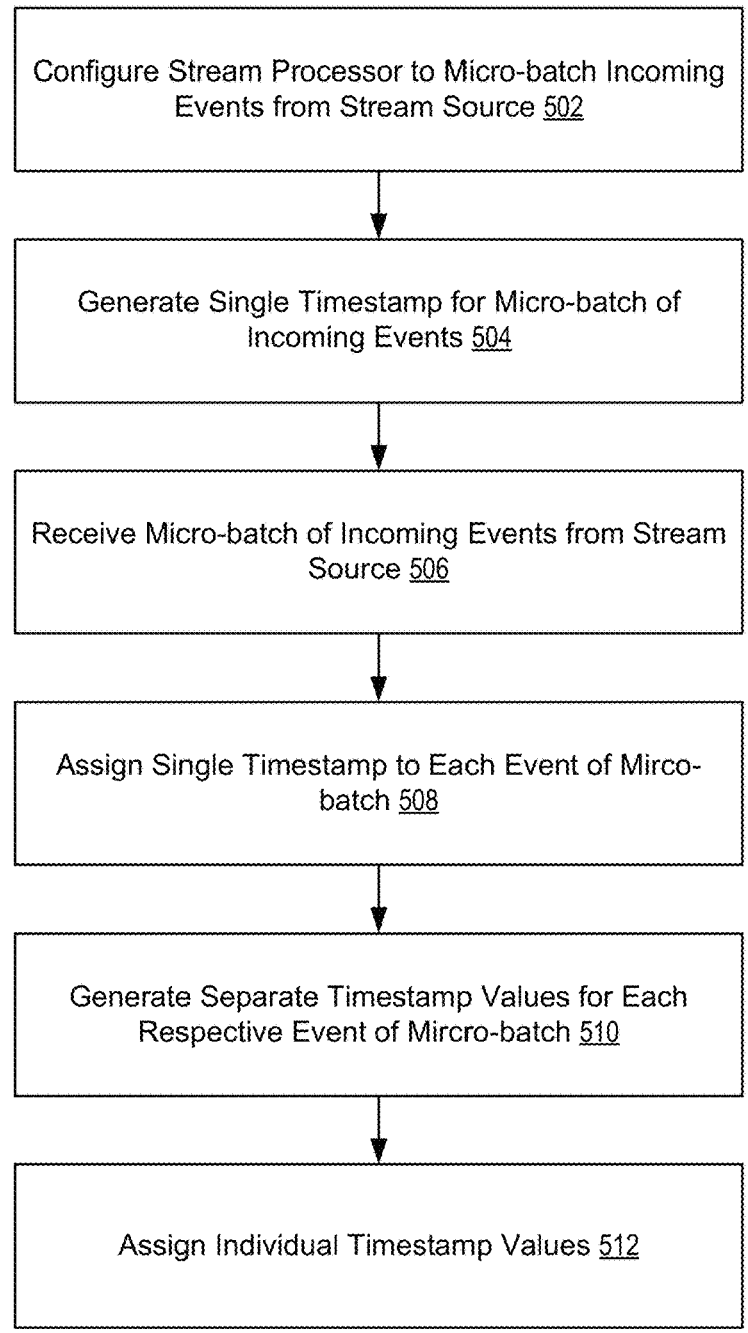
FIG. 5 is an example flow diagram of a process, in accordance with another embodiment of the present disclosure.

FIG. 5 is an example flow diagram of a process 500 that describes a set of operations for processing timestamps, in accordance with an embodiment of the present disclosure. In certain embodiments, the process 500 can be performed by a driver, such as driver 104 of FIG. 1, a generator, such as processing time generator 110 of FIG. 1, and/or a service, such as event processing service 202 of FIG. 2, each of which may be part of a distributed event processing system. The process of FIG. 5 describes one technique by which data in a batch of events can be time-stamped. The particular series of processing steps depicted in FIG. 5 is not intended to be limiting. Alternative embodiments may have more or less steps than those shown in FIG. 5 in various arrangements and combinations.

In certain embodiments, the process 500 begins at 502 by configuring a stream processor to micro-batch incoming events from a stream source. At 504, the process includes generating a single timestamp for a micro-batch of the incoming events. In certain examples, the process 500 may include receiving the micro-batch of the incoming events from the stream source at 506 and assigning the single timestamp to each event of the micro-batch at 508. At 510, the process 500 includes generating, based at least in part on an algorithm, separate timestamp values for each respective event of the micro-batch. Further, at 512, the process 500 includes assigning, for each respective event of the micro-batch, an individual one of the separate timestamp values.

Figure 6:
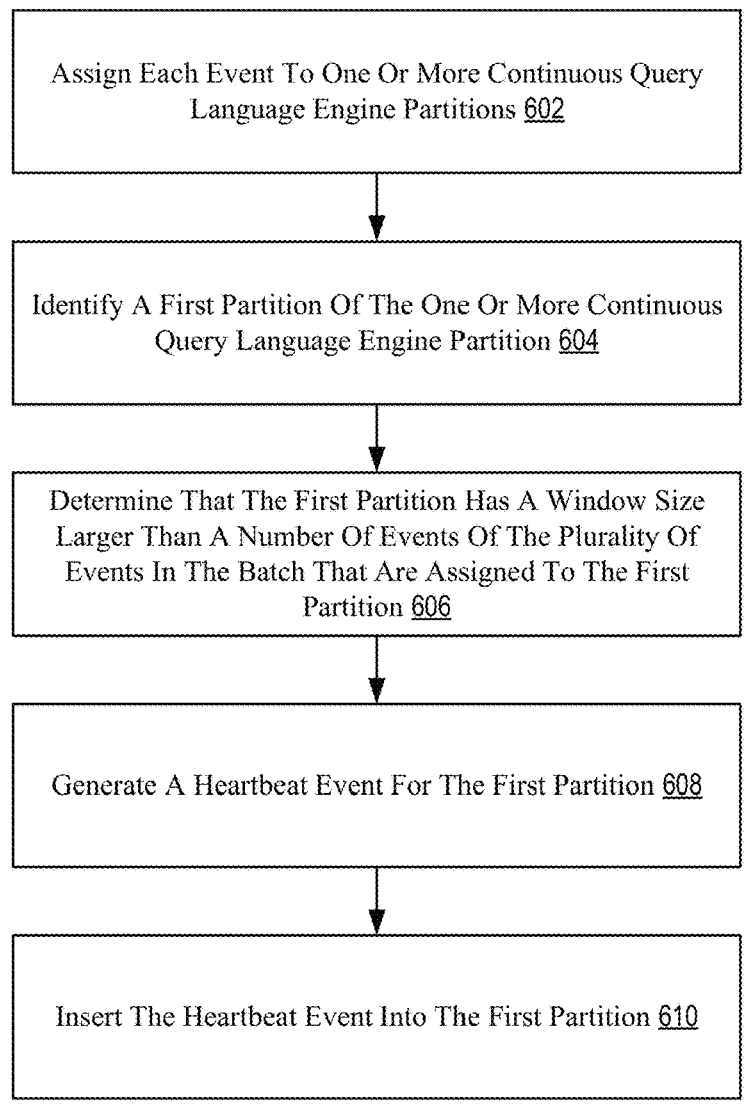
FIG. 6 is an example flow diagram of a process, in accordance with another embodiment of the present disclosure.

FIG. 6 is an example flow diagram of a process 600 that describes a set of operations for generating and inserting heartbeat events in micro-batched data. In an embodiment, the process 600 describes additional details of the operations of process 500 of FIG. 5. In certain examples, the process 600 begins at 602 by assigning each event to one or more continuous query language engine partitions. At 604, the process includes identifying a first partition of the one or more continuous query language engine partition. At 606, the process includes determining that the first partition has a window size larger than a number of events of the plurality of events in the batch that are assigned to the first partition. At 608, the process includes generating a heartbeat event for the first partition. At 610, the process includes inserting the heartbeat event into the first partition.

Illustrative Systems

Figure 7:
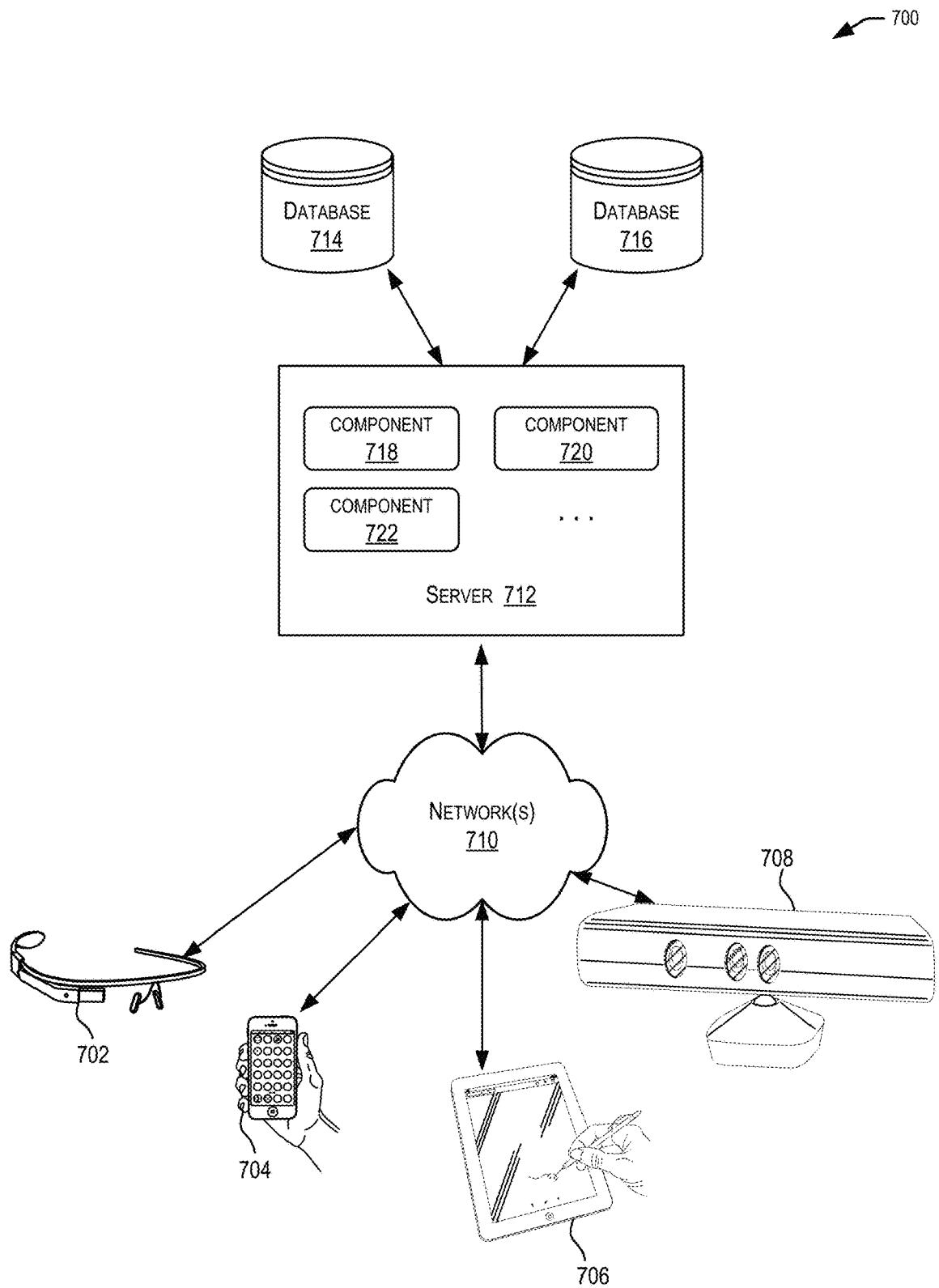
FIG. 7 depicts a simplified diagram of a distributed system for implementing an embodiment of the present disclosure.
Figure 8:
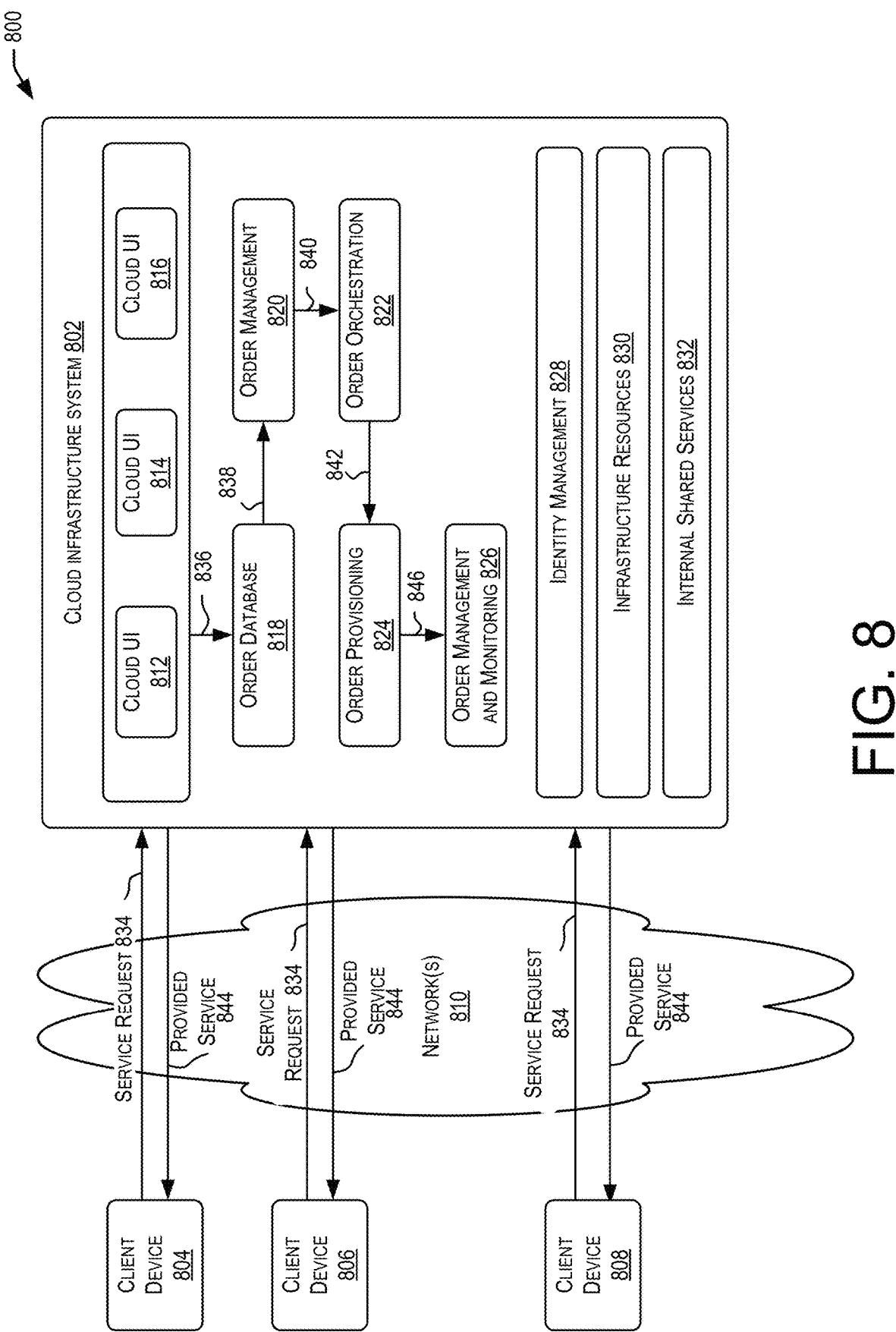
FIG. 8 is a simplified block diagram of one or more components of a system environment by which services provided by one or more components of an embodiment system may be offered as cloud services, in accordance with an embodiment of the present disclosure.
Figure 9:
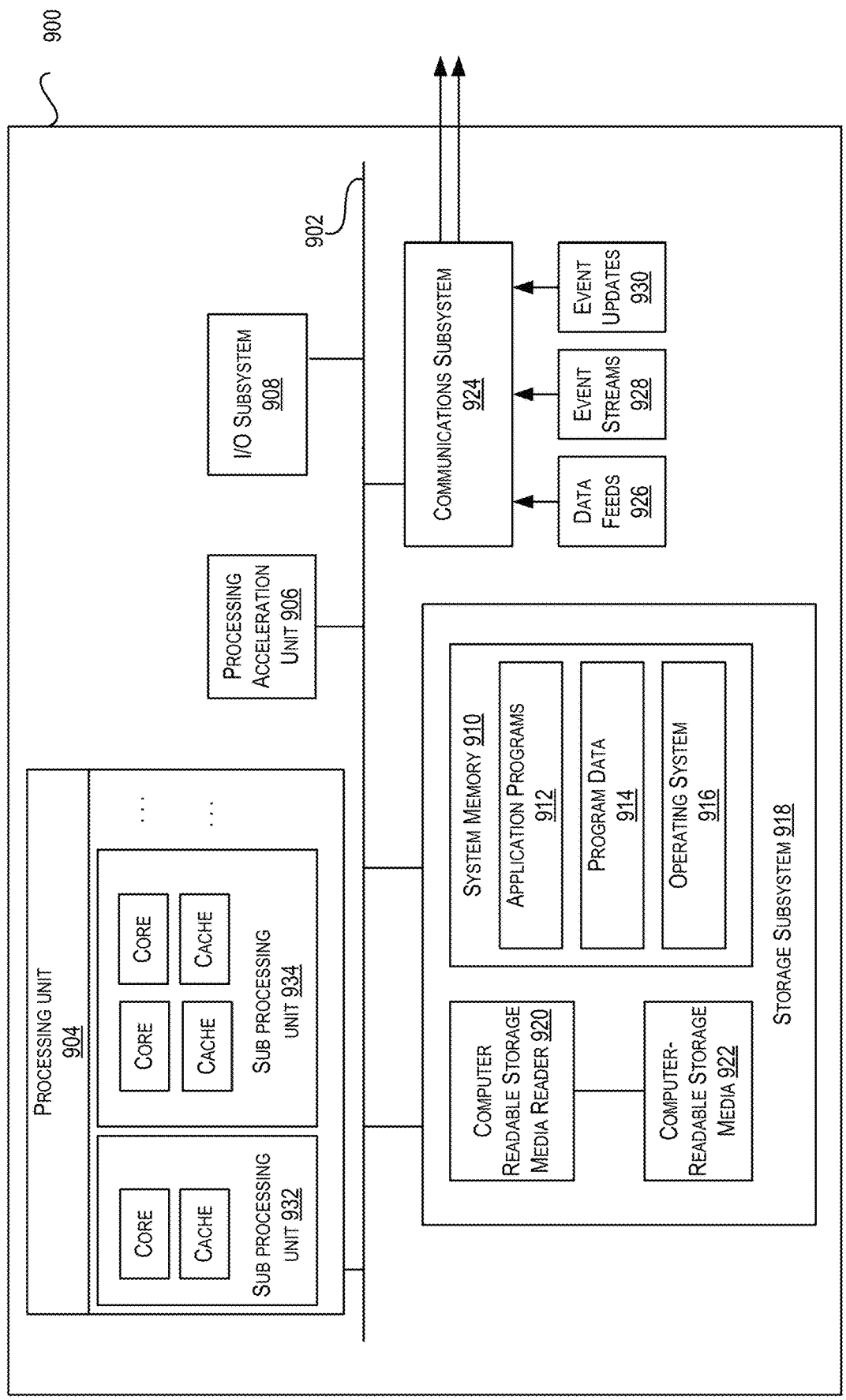
FIG. 9 illustrates an example computer system that may be used to implement an embodiment of the present disclosure.

FIGS. 7-9 illustrate aspects of example environments for implementing aspects of the present disclosure in accordance with various embodiments. FIG. 7 depicts a simplified diagram of a distributed system 700 for implementing an embodiment of the present disclosure. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide event processing services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 706, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 7, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 702.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as event information, and other information used by embodiments of the present disclosure. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 502, 504, 506, and 508.

Although example system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In example operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802. At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

FIG. 9 illustrates an example computer system 900 that may be used to implement an embodiment of the present disclosure. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. Additionally, communication subsystem 924 may be used to communicate notifications of successful logins or notifications to re-enter a password from the privileged account manager to the requesting users.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 9217, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
generating a micro-batch of incoming events by micro-batching the incoming events from a stream source, wherein the micro-batch comprises a number of events of a size;
generating a single timestamp for the micro-batch of the incoming events, the single timestamp indicative of a time of generation of the micro-batch;
assigning the single timestamp to each event of the micro-batch;
generating, based at least in part on an algorithm, separate timestamp values for each respective event of the micro-batch; and
assigning, for each respective event of the micro-batch, an individual one of the separate timestamp values, wherein assigning the individual one of the separate timestamp values includes appending each separate timestamp value to the single timestamp for each event of the micro-batch, each appended timestamp uniquely identifying each event and identifying each event as part of the micro-batch.

2. The method of claim 1, wherein the algorithm comprises a wall clock progression algorithm, an evenly distributed algorithm, or a simple sequence algorithm.

3. The method of claim 1, wherein assigning the individual one of the separate timestamp values comprises appending the individual one of the separate timestamp values to the single timestamp for each event of the micro-batch.

4. The method of claim 1, wherein the algorithm provides a unique timestamp for each event of the micro-batch.

5. The method of claim 4, wherein the algorithm ensures that each event of the micro-batch is identifiable as being part of the micro-batch.

6. The method of claim 1, further comprising assigning each event to one or more continuous query language engine partitions.

7. The method of claim 6, further comprising:
identifying a first partition of the one or more continuous query language engine partitions; and
determining that the first partition has a window size larger than the number of events of a plurality of events in a batch that are assigned to the first partition.

8. The method of claim 7, further comprising:
generating a heartbeat event for the first partition; and
inserting the heartbeat event into the first partition.

9. A system, comprising:
a memory configured to store computer-executable instructions; and
a processor configured to access the memory and execute the computer-executable instructions to at least:
generate a micro-batch of incoming events by micro-batching the incoming events from a stream source, wherein the micro-batch comprises a number of events of a specific size;
generate a single timestamp for the micro-batch of the incoming events, the single timestamp indicative of a time of generation of the micro-batch;
assign the single timestamp to each event of the micro-batch;
generate, based at least in part on an algorithm, separate timestamp values for each respective event of the micro-batch; and
assign, for each respective event of the micro-batch, an individual one of the separate timestamp values, wherein assigning the individual one of the separate timestamp values includes appending each separate timestamp value to the single timestamp for each event of the micro-batch, each appended timestamp uniquely identifying each event and identifying each event as part of the micro-batch.

10. The system of claim 9, wherein the algorithm comprises a wall clock progression algorithm, an evenly distributed algorithm, or a simple sequence algorithm.

11. The system of claim 9, wherein assigning the individual one of the separate timestamp values comprises appending the individual one of the separate timestamp values to the single timestamp for each event of the micro-batch.

12. The system of claim 9, wherein the algorithm provides a unique timestamp for each event of the micro-batch.

13. The system of claim 12, wherein the algorithm ensures that each event of the micro-batch is identifiable as being part of the micro-batch.

14. The system of claim 9, wherein the processor is further configured to execute the computer-executable instructions to at least:
assign each event to one or more continuous query language engine partitions;
identify a first partition of the one or more continuous query language engine partitions;
determine that the first partition has a window size larger than the number of events of a plurality of events in a batch that are assigned to the first partition;
generate a heartbeat event for the first partition; and
insert the heartbeat event into the first partition.

15. A non-transitory computer-readable medium storing computer-executable code that, when executed by a processor, cause the processor to perform operations comprising:
generating a micro-batch of incoming events by micro-batching the incoming events from a stream source, wherein the micro-batch comprises a number of events of a size;
generating a single timestamp for the micro-batch of the incoming events, the single timestamp indicative of a time of generation of the micro-batch;
assigning the single timestamp to each event of the micro-batch;
generating, based at least in part on an algorithm, separate timestamp values for each respective event of the micro-batch; and
assigning, for each respective event of the micro-batch, an individual one of the separate timestamp values, wherein assigning the individual one of the separate timestamp values includes appending each separate timestamp value to the single timestamp for each event of the micro-batch, each appended timestamp uniquely identifying each event and identifying each event as part of the micro-batch.

16. The non-transitory computer-readable medium of claim 15, wherein the algorithm comprises a wall clock progression algorithm, an evenly distributed algorithm, or a simple sequence algorithm.

17. The non-transitory computer-readable medium of claim 15, wherein assigning the individual one of the separate timestamp values comprises appending the individual one of the separate timestamp values to the single timestamp for each event of the micro-batch.

18. The non-transitory computer-readable medium of claim 15, wherein the algorithm provides a unique timestamp for each event of the micro-batch.

19. The non-transitory computer-readable medium of claim 18, wherein the algorithm ensures that each event of the micro-batch is identifiable as being part of the micro-batch.

20. The non-transitory computer-readable medium of claim 15, wherein the operations comprise:
- assigning each event to one or more continuous query language engine partitions;
- identifying a first partition of the one or more continuous query language engine partitions;
- determining that the first partition has a window size larger than the number of events of a plurality of events in a batch that are assigned to the first partition;
- generating a heartbeat event for the first partition; and
- inserting the heartbeat event into the first partition.

\* \* \* \* \*

UNITED STATES PATENT AND TRADEMARK OFFICE
CERTIFICATE OF CORRECTION

PATENT NO. : 11,061,722 B2
APPLICATION NO. : 16/653758
DATED : July 13, 2021
INVENTOR(S) : Park et al.

Page 1 of 1

It is certified that error appears in the above-identified patent and that said Letters Patent is hereby corrected as shown below:

In the Drawings

On sheet 5 of 9, in FIG. 5, under Reference Numeral 508, Line 1, delete "Mirco-" and insert -- Micro- --, therefor.

On sheet 5 of 9, in FIG. 5, under Reference Numeral 510, Line 2, delete "Mirco-" and insert -- Micro- --, therefor.

In the Specification

In Column 7, Line 42, delete "an a" and insert -- a --, therefor.

In Column 11, Line 67, delete "402" and insert -- 402. --, therefor.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*